(12) United States Patent
Chen

(10) Patent No.: US 7,436,448 B2
(45) Date of Patent: Oct. 14, 2008

(54) DIGITAL STILL CAMERA MODULE

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 664 days.

(21) Appl. No.: 10/929,012

(22) Filed: Aug. 27, 2004

(65) Prior Publication Data

US 2005/0024521 A1    Feb. 3, 2005

(30) Foreign Application Priority Data

May 9, 2003    (TW) ............................... 92216122 U

(51) Int. Cl.
*H04N 5/235*    (2006.01)

(52) U.S. Cl. ....................................... 348/360; 348/362

(58) Field of Classification Search ................. 348/374, 348/340, 362; 257/433, 434; 250/239
See application file for complete search history.

(56) References Cited

U.S. PATENT DOCUMENTS

| 6,950,140 B2 * | 9/2005 | Fukuyoshi et al. ........... 348/340 |
| 2003/0137595 A1 * | 7/2003 | Takachi ....................... 348/340 |

* cited by examiner

*Primary Examiner*—Tuan V Ho
(74) *Attorney, Agent, or Firm*—Morris Manning Martin LLP; Tim Tingkang Xia, Esq.

(57) ABSTRACT

A digital still camera module includes a barrel (12) two lenses (10, 18), an aperture apparatus (16) having a transparent part, a filter (14) set on the transparent part of the aperture, and an image sensor (19). The lenses, the filter, the aperture apparatus and the image sensor are set in the barrel, with the image sensor being set at a bottom of the barrel, and the filter and the aperture apparatus being set below one of the lenses. Both lenses are upwardly convex. The encapsulation of the image sensor is by way of a CSP (Chip Scale Package), which includes a transparent glass cover (196). Pins extend down from a bottom of the image sensor, which enables a size of a circuit board (194) of the image sensor to be reduced. Thus the digital still camera module is relatively small and inexpensive, and has excellent optical capability.

19 Claims, 2 Drawing Sheets

DIGITAL STILL CAMERA MODULE

BACKGROUND OF THE INVENTION

1. Field of the Invention

The present invention relates to digital still camera modules, and particularly to digital still camera modules which are suitable for portable electronic devices.

2. Description of Prior Art

Currently, digital still camera modules are widely used in portable electronic devices. One trend in the ongoing development of digital still camera modules is to make them smaller and lighter in weight.

Referring to FIG. 2, a conventional digital still camera module includes a barrel 22, and a first lens 20, a filter 24, an aperture apparatus 26, a second lens 28 and an image sensor 29 set in the barrel 22 in that order from top to bottom. A top of the first lens 20 is concave, and a bottom of the first lens 20 is convex. Thus the focal length of the first lens 20 is relatively long, which requires the barrel 22 to be correspondingly long. Additionally, the space between the filter 24 and the aperture apparatus 26 also adds to the length of the barrel 22. Furthermore, the encapsulation of the image sensor 29 is by way of a PLCC (Plastic Leaded Chip Carrier). The chip which is encapsulated by the PLCC is square. Pins of the chip extend outward from around a periphery of the image sensor 29, which means that the image sensor 29 occupies additional area of a PCB (Printed Circuit Board) on which it is mounted. Moreover, the top of the image sensor 29 is covered by a glass.

With this structure, the image sensor 29 cannot adequately satisfy the requirement of high glass content, and the digital still camera module is not compact enough for many modern portable electronic devices such as mobile phones and PDAs (personal digital assistants). With price pressures growing in increasingly saturated consumer marketplaces, the digital still camera module is becoming regarded as unduly costly for installation in many portable electronic devices. Finally, the first lens 20 and the second lens 28 are spherical lenses, which have inherent spherical aberration. The spherical aberration may reduce the quality of images obtained.

An improved digital still camera module which overcomes the above-described problems is desired.

SUMMARY OF THE INVENTION

Accordingly, an object of the present invention is to provide a digital still camera module which has a small size, low cost and good optical capability.

A preferred digital still camera module of the present invention comprises a barrel, two lenses, an aperture having a transparent part, a filter set on the transparent part of the aperture, and an image sensor. The lenses, the filter, the aperture and the image sensor are set in the barrel, with the image sensor being set at a bottom of the barrel, and the filter and the aperture being set below one of the lenses. Both lenses are upwardly convex. The encapsulation of the image sensor is by way of a CSP (Chip Scale Package), which includes a transparent glass cover. Pins extend down from a bottom of the image sensor. The pins shorten the transmission paths of signals, decrease attenuation of the signals, and increase the capability of the signals to avoid interference such as electromagnetic interference (EMI). Furthermore, the pins enable a size of a circuit board of the image sensor to be reduced. Thus the digital still camera module is relatively small and inexpensive, and has excellent optical capability.

Other objects, advantages and novel features of the invention will become more apparent from the following detailed description when taken in conjunction with the accompanying drawings, in which:

DETAILED DESCRIPTION OF THE INVENTION

Figure 1:
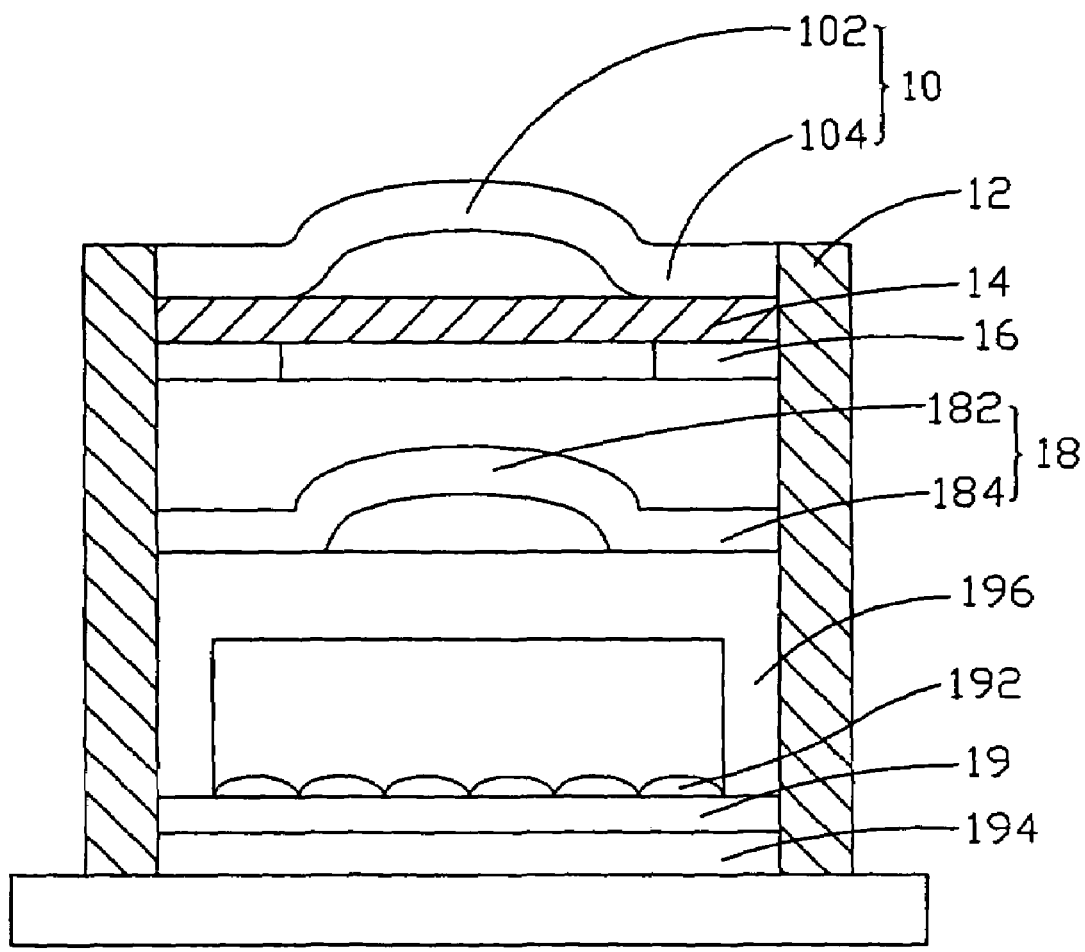
FIG. 1 is a schematic, cross-sectional view of a digital still camera module of a preferred embodiment of the present invention.
Figure 2:
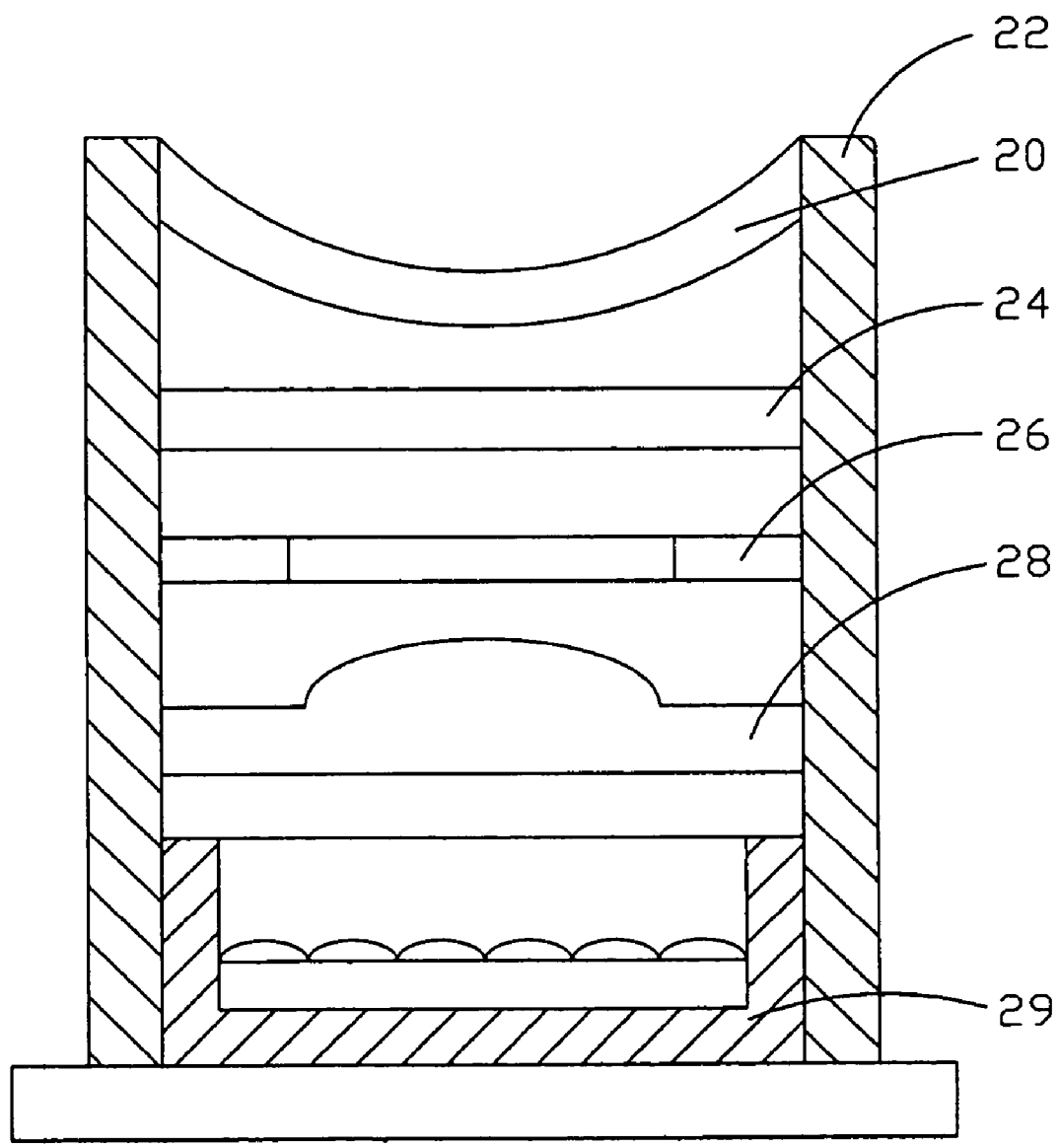
FIG. 2 is a schematic, cross-sectional view of a digital still camera module of the prior art.

Referring to FIG. 1, a digital still camera module of the present invention includes a barrel 12 used as a module outer package, a first lens 10, a filter 14, an aperture apparatus 16, a second lens 18 and an image sensor 19. The first lens 10, the filter 14, the aperture apparatus 16, the second lens 18 and the image sensor 19 are set in the barrel 12, in that order from top to bottom.

The first lens 10 and the second lens 18 are aspheric and together form a lens set. The first lens 10 and the second lens 18 respectively include a central lens part 102, 182, and a fixing part 104, 184 surrounding a periphery of the lens part 102, 182. The lens part 102, 182 protrudes convexly upwardly, and an underside of the lens part 102, 182 is concave.

The aperture apparatus 16 is made of a transparent material. A periphery of the aperture apparatus 16 is covered with an opaque material, thereby providing a desired aperture by a central transparent round area of the aperture apparatus 16 for controlling the quantity of the incoming light. The filter 14 is an infrared (IR) cut filter, and is set on the aperture apparatus 16 so that it covers the transparent round area of the aperture apparatus 16 and filters infrared light before it reaches the aperture of the aperture apparatus 16. The filter 14 can be coated on the aperture apparatus 16. Alternatively, the filter 14 can be attached on the fixing part 104 of the first lens 10 by adhesive.

The image sensor 19 can be a CCD (Charge Coupled Device) or a CMOS (Complementary Metal Oxide Semiconductor), for transforming light into electronic signals. The image sensor 19 includes a circuit board 194, and a plurality of micro lenses 192 set on the circuit board 194 for increasing the sensitivity and improving the light-collecting capability of the image sensor 19. The circuit board 194 is also integrated with other function modules for processing the electronic signals. The encapsulation of the image sensor 19 is by way of a CSP (Chip Scale Package). In particular, a transparent glass cover 196 is set on the image sensor 19, and the fixing part 184 of the second lens 18 is attached on the glass cover 196 by adhesive. Additionally, pins (not shown) extend down from a bottom of the image sensor 19. The pins shorten the transmission paths of signals, decrease attenuation of the signals, and increase the capability of the signals to avoid interference such as electromagnetic interference (EMI). Furthermore, the pins enable a size of the circuit board 194 to be reduced.

In summary, the advantages of the digital still camera module of the present invention is that its size is relatively small, it is relatively inexpensive, and it has excellent optical capability.

Although the present invention has been described with specific terms, it should be noted that the described embodiment is not necessarily exclusive, and that various changes and modifications may be made thereto without departing from the scope of the present invention as defined in the appended claims.

I claim:

1. A digital still camera module, comprising:
a barrel;
at least one lens;
an aperture apparatus comprising a transparent part;
a filter attached to one lens of the at least one lens and set on the transparent part of the aperture apparatus; and
an image sensor;
wherein the at least one lens, the filter, the aperture apparatus, and the image sensor are set in the barrel, with the image sensor being set at a bottom of the barrel, and the filter and the aperture apparatus being set below said one lens of the at least one lens, whereby the filter filters incoming infrared light before the infrared light reaches the transparent part of the aperture apparatus.

2. The digital still camera module as described in claim 1, wherein the at least one lens comprises said one lens and a second lens.

3. The digital still camera module as described in claim 2, wherein tops of said one lens and the second lens are convex, and bottoms of said one lens and the second lens are concave.

4. The digital still camera module as described in claim 3, wherein said one lens and the second lens respectively comprise a lens part.

5. The digital still camera module as described in claim 4, wherein said one lens and the second lens respectively comprise a fixing part surrounding the lens part.

6. The digital still camera module as described in claim 1, wherein the filter is an infrared (IR) cut filter.

7. The digital still camera module as described in claim 4, wherein the filter is attached to the fixing part of said one lens.

8. The digital still camera module as described in claim 1, wherein the filter is coated on the aperture apparatus.

9. The digital still camera module as described in claim 1, wherein the image sensor comprises a circuit board and a plurality of micro lenses set on the circuit board.

10. The digital still camera module as described in claim 5, wherein an encapsulation of the image sensor is by way of a CSP (Chip Scale Package).

11. The digital still camera module as described in claim 10, wherein the fixing part of the second lens is attached on the encapsulation of the image sensor.

12. The digital still camera module as described in claim 1, wherein the aperture apparatus is made of a transparent material, and a periphery of the aperture apparatus is covered with opaque material.

13. A digital still camera module installed in an electronic device to provide an image-taking function thereof, the digital still camera module comprising:
a module package providing a receiving space therein, a communicating opening being defined to provide a light passageway;
a lens set occupying said opening of said package and allowing incoming light to pass through a designed area of said lens set;
an aperture formed by an aperture apparatus in said lens set;
a filter attached to one lens of said lens set and set on said aperture apparatus;
an image sensor placed in the light passageway to create light-induced image signals for further use of the electronic device; and
said aperture apparatus being formed by a transparent material and the desired aperture formed thereon being measurable by making the periphery of said aperture apparatus opaque.

14. The digital still camera module as described in claim 13, wherein the filter is an infrared (IR) cut filter.

15. The digital still camera module as described in claim 13, wherein said one lens of said lens set is a first aspheric convex lens, said lens set further includes a second aspheric convex lens spaced from said first aspheric convex lens, and both of said first and second aspheric convex lenses are curved along a same direction protruding toward said opening of said module package.

16. The digital still camera module as described in claim 15, wherein said one lens of said lens set comprises a lens part and a fixing part surrounding the lens part, and the filter is attached to the fixing part of said one lens of said lens set.

17. The digital still camera module as described in claim 13, wherein said image sensor comprises a circuit board and a plurality of micro lenses set on said circuit board.

18. A digital still camera module installed in an electronic device to provide an image-taking function thereof, the digital still camera module comprising:
a module package providing a receiving space therein, a communicating opening being defined to provide a light passageway;
a lens set provided in the light passageway and allowing incoming light to pass through predetermined portions of said lens set;
an aperture apparatus disposed in said lens set and comprising a transparent part as an aperture to allow light-passing;
a filter attached to one lens of said lens set and set on said transparent part of said aperture apparatus; and
an image sensor having integrated therein a plurality of micro lenses and at least one electric-signal producing module, said micro lenses being used to receive the incoming light through said lens set, and said at least one electric-signal producing module being used to output electric signals based on results of light receiving of said micro lenses.

19. The digital still camera module as described in claim 18, wherein a transparent glass cover is further installed on said image sensor by way of a CSP (Chip Scale Package).

* * * * *